United States Patent Office 3,226,306
Patented Dec. 28, 1965

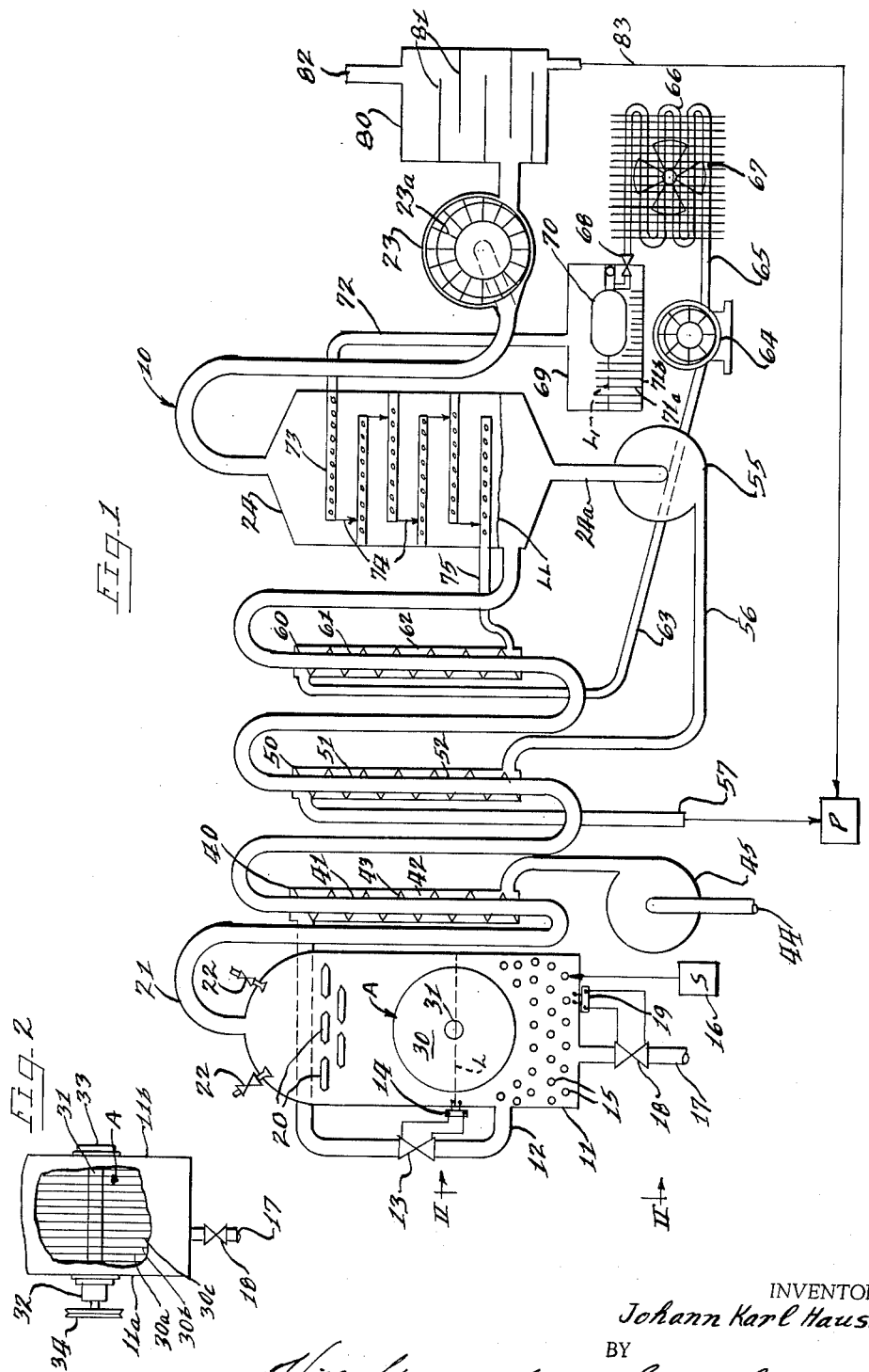

3,226,306
ROTARY FILM DISTILLATION AND GAS REFRIGERANT CONDENSING APPARATUS
Johann Karl Hausner, Chicago, Ill., assignor to Hausner Enterprises, Inc., Chicago, Ill., a corporation of Illinois
Filed Oct. 2, 1961, Ser. No. 142,093
5 Claims. (Cl. 202—177)

The present invention relates generally to the separation of a solvent from an impure form or composition thereof containing a normally solid material, and more particularly, to the separation of fresh water from salt water or other impure water sources.

Although the invention may have application in a number of fields, it is particularly useful in the production of fresh water from salt water or sea water and it will be described primarily in connection therewith. In essence, the instant invention relates to the evaporation of water from the impure water source under vacuum conditions and the condensation of the evaporated water via an improved cooling and condensation system. In addition, the instant invention involves an improved means for carrying out the evaporation or vaporization of the water or other solvent which is to be evaporated and then recovered in substantially pure form. The improved evaporating means includes the use of evaporating aids which present substantial surface areas, which are moved through a cycle that involves repeatedly submerging such evaporation aids in the impure liquid in the evaporation chamber and then withdrawing such evaporation aids from the liquid. Preferably, this is carried out by rotating a plurality of discs which are partially submerged in the impure liquid in the evaporating chamber.

It is, therefore, an important object of the instant invention to provide an improvement in the recovery of a substantially pure solvent from an impure form containing normally solid material.

Yet another object of the instant invention is to provide an improved apparatus for recovering fresh water from sea water.

Other and further objects, features and advantages of the present invention will become apparent to those skilled in the art from the following detailed disclosure thereof and the drawings attached hereto and made a part hereof.

On the drawings:

FIGURE 1 is an essentially diagrammatic elevational view of an apparatus embodying the instant invention; and FIGURE 2 is a view taken generally along the line II—II of FIGURE 1, with a portion of the side wall of the evaporation chamber removed to show the evaporation aids therein.

As shown on the drawings:

In FIGURE 1, the embodiment of the instant invention is indicated generally by the reference numeral 10, as an apparatus for recovering fresh water from sea water. The apparatus 10 comprises a generally vertical evaporation chamber 11 formed of suitable non-corrosive structural material such as stainless steel. Sea water is fed into the bottom of the chamber 11 via an inlet line 12 having a control valve 13 which is controlled by conventional level sensing means 14 for maintenance of a sea water level L in the chamber 11. The chamber 11 is also provided with a plurality of heating pipes shown diagrammatically at 15 beneath the liquid level L for heating the sea water. The pipes 15 may contain steam or any other suitable heat exchange liquid provided from a suitable source indicated diagrammatically at 16; and the heating of the sea water in the chamber 11 is carried out in a conventional manner. A slurry or concentrated sea water removal line 17 is provided at the bottom of the chamber 11 for withdrawing the concentrated or high solids content material continuously or intermittently through a valve 18. Preferably, the valve 18 is controlled by electrolytic sensing control means indicated diagrammatically at 19, which are of conventional structure and function, and which operate to open the valve 18 when the concentration of salt or electrolyte reaches a predetermined quantity.

The evaporation chamber 11 is preferably also provided with baffles shown at 20 near the top thereof for obtaining a superheated steam effect by additionally heating the evaporated or vaporized water in the area above the liquid level L. The baffles 20 are preferably heated by suitable heating means, which include steam coils from the heat exchange fluid source 16. After the vaporized water or other solvent has passed beyond the baffles 20 it leaves the top of the evaporation chamber 11 through a top exit 21.

It will also be noted that the top of the evaporation chamber 11 is equipped with a plurality of cleaning showers 22, 22 which showers are turned off during ordinary operation, but which are used to assist in cleaning out the interior of the chamber 11 during shut down and maintenance.

The water vapor exit 21 is connected via a conduit system which will be discussed in detail hereinafter to suitable gas pressure reducing means, in the form of a suitable vacuum pump shown at 23 near the far right hand side of the apparatus 10. The vacuum pump 23 is equipped with a conventional blower type impeller indicated at 23a which is mounted on suitable bearings using a water seal type of lubrication, which operates in the absence of any oil lubricant in the interest of avoiding contamination of the fresh water product. The vacuum pump 23 is employed to maintain subatmospheric pressure in a condenser 24 and throughout the conduit system feeding vaporized water from the evaporation chamber 11 through the exit 21 into the condenser 24. Preferably the vacuum maintained in the evaporation chamber 11 above the level L is 45 to 50 mm. Hg.

The evaporation of the water or other solvent in the evaporation chamber 11 is assisted by evaporation aids of the invention indicated generally at A in FIGURES 1 and 2. In general, the evaporation aids comprise a substantial amount of surface area which is moved through a cycle back and forth above and below the liquid level L. As here shown, the evaporation aids A comprise a plurality of discs, indicated at 30a, 30b, 30c, etc., in FIGURE 2, and only one of which is indicated at 30 in side elevation in FIGURE 1. Such discs are mounted on a shaft 31 lying at approximately the region of the level L and suitably mounted in water lubricated bearings 32 and 33 (FIGURE 2) carried by the side walls 11a and 11b of the evaporation chamber 11. The shaft 31 is rotated via a drive pulley 34 by any conventional drive means. The lubrication for the shaft 31 is provided by water when the impure material employed is sea water (or by whatever solvent that is being recovered in the instant apparatus, if it is not water).

As indicated, the rotary evaporation aids or discs 30a, 30b, 30c, etc. are partially submerged in the liquid and are partially exposed to the vaporized solvent in the chamber 11. In this way the discs 30, etc. may continuously rotate with a portion thereof submerged beneath the liquid level L and a portion thereof above the liquid level. The rate of rotation is sufficiently slow to avoid excessive turbulence of the liquid, or splashing thereof in the chamber 11.

The discs 30, etc. which have been found to be particularly suitable for the practice of the instant invention in the production of fresh water from salt water are discs formed of 25 mesh screen of 304 stainless steel, which has been chrome plated. The chrome plating of these disc-shaped screens is a conventional chrome plating process which is carried out using a bath temperature of 65–70° C. and a bath having a composition, per 100 ml. of bath, of 250 grams $CrO_3$, 3 grams of $H_2SO_4$, and the remainder substantially water. The chrome plating is, however, carried out in such bath using 20 to 25 amperes per square inch of screen area. This current density is measured on the basis of the overall area of the generally circular disc of screen, and not on the area of the wires per se. Such current density is substantially higher than that ordinarily employed for chrome plating (which is about 2 to 3 amperes per square inch); but it has been found that the higher current density of 20 to 25 amperes per square inch gives better results. The improved results comprise more uniform vaporization of the water, with less turbulence or splashing or other undesirable phenomena; and the use of the instant discs has been found to facilitate evaporation of the water at the minimum permissible temperatures for the subatmospheric pressure maintained in the chamber 11.

Other important aspects of the instant invention reside in the heat balance system which is provided by the use of one or more heat exchangers interposed between the evaporation chamber 11 and the condenser 24. Such heat exchangers are shown in FIGURE 1 as a first heat exchanger 40, a second heat exchanger 50, and a third heat exchanger 60 which are mounted in series. One or two of such heat exchangers may be omitted in the operation of the instant invention, but distinctly superior results have been obtained by the use of all three in series for the purposes specifically disclosed herein.

First of all, it will be appreciated that each of the heat exchangers 40, 50, 60 is constructed with separate passes, so that there is no intermingling between the fluid in one pass and the fluid in a second pass in the same heat exchanger. It will thus be seen that the vaporized water leaving the exit 21 is received by the first heat exchanger 40 in a central pass 41 thereof, which discharges into the second heat exchanger 50 through a central pass 51 thereof, which in turn discharges into the third heat exchanger 60 through a central pass 61 thereof. And the central pass 61, in turn, discharges into the condenser 24. It will be appreciated that the central passes 41, 51 and 61 shown diagrammatically herein do not necessarily comprise only a single tube passing through the heat exchangers 40, 50 and 60, respectively; but instead the pass 41 may comprise a plurality of tubes in a conventional heat exchange structure, with the space for the second pass surrounding such tubes. As here indicated, the second pass 42 flows within the first heat exchanger 40 surroundingly of the central pass 41 via baffles 43 which make possible a longer path of travel through the second pass.

Sea water or other impure form of solvent to be treated in the apparatus 10 is drawn up through the suction 44 of a suitable feed pump 45 and discharged from the feed pump 45 into the second pass of the heat exchanger 40, from which it flows through the valve 13 and into the inlet line 12 feeding into the evaporation chamber 11. It will be appreciated that the incoming sea water being fed through the pump 45 has a temperature of perhaps 20° C. depending upon the particular region from which the sea water is taken, and it is desirable to preheat the sea water in the first heat exchanger 40 as much as possible so as to minimize the amount of external heat from the source 16 that is required to ultimately vaporize the water in the evaporation chamber 11; and it is also desirable to cool the vaporized water in the central pass 41 of the heat exchanger 40 as much as possible so as to minimize the amount of cooling required to effect condensation in the condenser 24.

Next, the vaporized water discharged from the first heat exchanger 40 goes through the pass 51 of the second heat exchanger 50 where it is further cooled, this time by the condensed water product which is withdrawn from the bottom exit 24a of the condenser 24 beneath the condensate level LL therein. The condensed water is fed through the exit line 24a into the suction of a suitable pump 55, which discharges the condensate through a line 56 and into the external pass 52 of the second heat exchanger 50, whereat the condensate cools the water vapor in the central pass 51, and the condensate is then heated approximately to room temperature and withdrawn through a product line 57 where it is recovered as fresh water.

The water vapor discharged from the second heat exchanger 50 goes through the central pass 61 of the third heat exchanger 60 where it is cooled further by a refrigerant gas flowing through the exterior pass 62 of the third heat exchanger.

In completing the cycle of the refrigerant gas it will be seen that after it flows from the exterior pass to the third heat exchanger 60 it is drawn through a suction line 63 leading to the intake of a compressor 64, which compresses the gas and discharges the same through a line 65 into a coil 66 whereat a conventional air blower 67 effects the necessary cooling to complete the condensation of the refrigerant gas, converting the same to a liquid which is fed through a valve 68 into a separation chamber 69.

Preferably the refrigerant gas is carbon dioxide, although the "Freon" refrigerants may also be used. The liquefied refrigerant gas maintains a level $L_1$ in the separation chamber 69, above which is formed the vaporized refrigerant, which in the case of carbon dioxide is then at a temperature of about $-25°$. In contrast, the temperature of the carbon dioxide vapor in the intake line 63 for the compressor 64 is preferably about 10 to 20° C. The level $L_1$ in the separation chamber 69 is maintained by suitable level control means such as a float 70 in control of the valve 68, which is a conventional float control valve arrangement. The separation chamber 69 preferably also contains a plurality of closely spaced chrome plated stainless steel screens which are made in the manner in which the disc-shaped screens 30 are made. These screens designated 71a, 71b, etc. in the separation chamber 69 have been found to assist in the maintenance of the level $L_1$ for uniform control of the refrigerant cycle.

The cold refrigerant gas or vapor leaves the separation chamber through an exit 72 above the level $L_1$ and flows through heat exchange coils shown diagrammatically at 73 in the condenser 24.

The heat exchange coils 73 for the refrigerant vapor are, of course, interconnected as indicated by the arrows 74, so that the refrigerant gas flowing therethrough utlimately exits through a line 75 which feeds into the exterior pass 62 of the third heat exchanger 60.

The vacuum pump 23 discharges into a recovery tower 80 which comprises a plurality of plates 81 or baffles which make an elongated path for air being driven out the discharge of the suction pump 32 and ultimately out of a stack 82 at the top of the tower 80. The tower 80 may be maintained at room temperature, or cooled by a suitable source of water (not shown), and it is also maintained at substantially atmospheric pressure, so that the cold gases exiting from the suction pump 23 will condense out any water vapor therein, and this water vapor will accumulate on the baffles or plates 81 and flow downwardly through a discharge line 83 at the bottom thereof, from which it may be fed over to the fresh water product collector indicated diagrammatically at P.

The condensed water which is collected at the bottom of the condenser 24 preferably has a temperature of about 3–4° C., and this water is heated to approximately room temperature as it flows through the exterior pass 52 of the second heat exchanger 50.

It will thus be seen that the heat balance provided by the apparatus of the instant invention makes possible a number of economies.

It will also be appreciated that the instant invention may be used to obtain a substantially pure solvent from other forms of impure solvents containing normally solid materials; or the instant invention may be used in the case of aqueous systems to obtain fresh water from impure water containing salt, clays, algae, or other matter which may be found in impure river water or in sea water.

It will be understood that modifications and variations may be effected without departing from the spirit and scope of the novel concepts of the present invention.

I claim as my invention:

1. Apparatus for separating solvent from an impure form thereof containing a normally solid material, which comprises an evaporation chamber, liquid level control means for maintaining a liquid level of said impure form therein, heating means for said chamber for evaporating said solvent from said impure form, gas pressure reducing means connected to the interior of said chamber above the liquid level, condenser means connected with said chamber for recovering solvent evaporated therein, first and second heat exchangers mounted in series receiving evaporated solvent from said evaporation chamber and connected to said condenser means, a refrigerant gas system including a compressor for converting the gas to liquid, a separation chamber connected to the discharge of said compressor, means for maintaining a liquid refrigerant level therein, and means feeding gas from said separation chamber through said condenser means and then through said second heat exchanger and back to the compressor, return means receiving condensed solvent from said condenser means and passing the same through said first heat exchanger to cool evaporated solvent passing therethrough, and thin substantially rigid structural elements presenting substantial surface areas for contacting liquid and thereby adapted to function as evaporation aids mounted in said chamber for movement thereof through a cycle back and forth above and below said liquid level, said heat exchangers being disposed between said evaporation chamber and said condenser means and each of said heat exchangers having a first and a second pass separated by a fluid flow barrier therein with the evaporated solvent being passed through the first pass of each and the refrigerant gas being passed through the second pass of each of such heat exchangers.

2. Apparatus as claimed in claim 1 wherein said structural elements comprise a multiplicity of coaxially mounted chrome-plated disk-shaped screens.

3. Apparatus for separating solvent from an impure form thereof containing a normally solid material, which comprises an evaporation chamber, liquid level control means for maintaining a liquid level of said impure form therein, heating means for said chamber for evaporating said solvent from said impure form, gas pressure reducing means connected to the interior of said chamber above the liquid level, condenser means connected with said chamber for recovering solvent evaporated therein, first and second heat exchangers mounted in series receiving evaporated solvent from said evaporation chamber and connected to said condenser means, impure solvent source means feeding the same into said chamber via said first heat exchanger, return means receiving condensed solvent from said condenser means and passing the same through said second heat exchanger to cool evaporated solvent passing therethrough, and thin substantially rigid structural elements presenting substantial surface areas for contacting liquid and thereby adapted to function as evaporation aids mounted in said chamber for movement thereof through a cycle back and forth above and below said liquid level, said heat exchangers being disposed between said evaporation chamber and said condenser means and each of said heat exchangers having a first and a second pass separated by a fluid flow barrier therein with the evaporated solvent being passed through the first pass of each and the refrigerant gas being passed through the second pass of each of such heat exchangers.

4. Apparatus for separating solvent from an impure form thereof containing a normally solid material, which comprises an evaporation chamber, liquid level control means for maintaining a liquid level of said impure form therein, heating means for said chamber for evaporating said solvent from said impure form, gas pressure reducing means connected to the interior of said chamber above the liquid level, condenser means connected with said chamber for recovering solvent evaporated therein, first, second and third heat exchangers mounted in series receiving evaporated solvent from said evaporation chamber and connected to said condenser means, a refrigerant gas system including a compressor for converting the gas to liquid, a separation chamber connected to the discharge of said compressor, means for maintaining a liquid refrigerant level therein, and means feeding gas from said separation chamber through said condenser means and then through said third heat exchanger and back to the compressor, return means receiving condensed solvent from said condenser means and passing the same through said second heat exchanger to cool evaporated solvent passing therethrough, impure solvent source means feeding the same into said chamber via said first heat exchanger, and thin substantially rigid structural elements presenting substantial surface areas for contacting liquid and thereby adapted to function as evaporation aids mounted in said chamber for movement thereof through a cycle back and forth and below said liquid level, said heat exchangers being disposed between said evaporation chamber and said condenser means and each of said heat exchangers having a first and a second pass separated by a fluid flow barrier therein with the evaporated solvent being passed through the first pass of each and the refrigerant gas being passed through the second pass of each of such heat exchangers.

5. Apparatus for separating solvent from an impure form thereof containing a normally solid material, which comprises an evaporation chamber, liquid level control means for maintaining a liquid level of said impure form therein, heating means for said chamber for evaporating said solvent from said impure form, gas pressure reducing means connected to the interior of said chamber above the liquid level, condenser means connected with said chamber for recovering solvent evaporated therein, first, second and third heat exchangers mounted in series receiving evaporated solvent from said evaporation chamber and connected to said condenser means, a refrigerant gas system including a compressor for converting the gas to liquid, a separation chamber connected to the discharge of said compressor, means for maintaing a liquid refrigerant level therein, and means feeding gas from said separation chamber through said condenser means and then through said third heat exchanger and back to the compressor, return means receiving condensed solvent from said condenser means and passing the same through said second heat exchanger to cool evaporated solvent passing therethrough, impure solvent source means feeding the same into said chamber via said first heat exchanger, and a plurality of chrome plated stainless steel discs presenting substantial surface areas for contacting liquid and mounted for rotation on a shaft mounted for rotation in said evaporation chamber in proximity to said liquid level, whereby said discs rotate partially in the impure liquid form and partially in evaporated solvent above said level, said heat exchangers being disposed between said evaporation chamber and said condenser means and each of said heat exchangers having a first and a second pass separated by a fluid flow barrier therein with the evaporated solvent being passed through the first pass of each and the refrigerant gas being passed through the second pass of each of such heat exchangers.

(References on following page)

References Cited by the Examiner

UNITED STATES PATENTS

| | | | |
|---|---|---|---|
| 1,466,670 | 9/1923 | Monti | 202—75 |
| 1,808,494 | 6/1931 | Carney et al. | 62—79 |
| 1,876,551 | 9/1932 | Barstow et al. | 62—23 |
| 1,921,850 | 8/1933 | Voorhees | 202—236 |
| 2,180,634 | 11/1939 | Hubacker | 62—89 |
| 2,441,361 | 5/1948 | Kirgan. | |
| 2,514,944 | 7/1950 | Ferris et al. | 202—236 |
| 2,698,287 | 12/1954 | Bowden et al. | 202—236 |
| 2,703,310 | 3/1955 | Kretchmar | 62—512 |
| 2,882,698 | 4/1959 | Boyle | 62—512 |
| 2,975,107 | 3/1961 | Friedman. | |

FOREIGN PATENTS 978,997  4/1951  France.

NORMAN YUDKOFF, *Primary Examiner.*

GEORGE D. MITCHELL, *Examiner.*